(12) United States Patent
Chien et al.

(10) Patent No.: US 7,455,269 B1
(45) Date of Patent: Nov. 25, 2008

(54) SUCTION DEVICE

(76) Inventors: Li-Sheng Chien, 5F., No. 67, Lane 201, Jhongjheng Rd., Shihlin District, Taipei City 111 (TW); Chien-Chang Ho, 5F., No. 8, Alley 1, Lane 25, Fongjiang Rd., Taishan Township, Taipei County 243 (TW)

( * ) Notice: Subject to any disclaimer, the term of this patent is extended or adjusted under 35 U.S.C. 154(b) by 0 days.

(21) Appl. No.: 11/774,661

(22) Filed: Jul. 9, 2007

(51) Int. Cl.
*A47F 5/00* (2006.01)

(52) U.S. Cl. .................................... 248/205.8

(58) Field of Classification Search ............. 248/205.8, 248/205.9, 206.1, 206.2, 205.5, 363, 362, 248/683, 205.6, 205.7
See application file for complete search history.

(56) References Cited

U.S. PATENT DOCUMENTS 5,104,077 A * 4/1992 Liu .......................... 248/205.8
6,932,306 B2 * 8/2005 Zou et al. ................ 248/205.5
2007/0215766 A1 * 9/2007 Yen ........................... 248/205.8
2007/0257167 A1 * 11/2007 Richter ..................... 248/205.8
2007/0278369 A1 * 12/2007 Yu ............................ 248/205.8
2008/0061199 A1 * 3/2008 Chen ........................ 248/205.8

* cited by examiner

*Primary Examiner*—Ramon O Ramirez
(74) *Attorney, Agent, or Firm*—Schmeiser, Olsen & Watts

(57) ABSTRACT

A suction device includes a sucker holder being provided at an upper side with a fitting zone; a control lever including a sleeve portion movably fitted in the fitting zone, and a lever portion extended from one side of the sleeve portion to locate in a gap at the fitting zone; and a sucker unit including a suction cup located in a cavity below the sucker holder, a link provided to a back of the suction cup to extend through the fitting zone, an elastic element mounted between the suction cup and the sucker holder, and a lid mounted in the sleeve portion to couple with the link. When the control lever is pushed in a predetermined direction, the lid is moved upward to pull the suction cup via the link for the sucker unit to tightly suction adhere to a desired position.

10 Claims, 3 Drawing Sheets

SUCTION DEVICE

FIELD OF THE INVENTION

The present invention relates to a suction device, and more particularly to a suction device that can be tightly suction adhered to a desired place by operating a control level thereof.

BACKGROUND OF THE INVENTION

A suction cup is widely employed in people's daily life. Different articles, such as safety rail, grab rail, tray, hook, etc., may be firmly attached to a smooth surface, such as a tiled wall surface, via a suction cup to perform their intended functions.

Generally, the suction cup can only be suction-adhered to a tiled or other type of smooth wall surface, and is not provided with any structure to enhance its adherence to the wall surface. Conventional suction cup is subject to loosening, slipping, or even separating from the wall surface when it is used in a wet bathroom, has been used to support a heavy load over a long period of time, or is affected by other external environmental factors. The loosened or slipped suction cup usually looks just as usual before it finally separates from the wall surface, and a user might not be aware of any potential dangers thereof. When a user grips at an article mounted on a wall via a suction cup that has become loosened or displaced, an accident will happen.

SUMMARY OF THE INVENTION

It is therefore a primary object of the present invention to provide a suction device that may be tightly suction-adhered to a desired place by operating a control lever thereof.

To achieve the above and other objects, the suction device according to the present invention includes a sucker holder provided at a lower side with a cavity, and at an upper side with a limiting seat communicating with the cavity, and an annular stopper extended around the limiting seat to form a fitting zone between them; a control lever including a sleeve portion movably fitted in the fitting zone and internally provided with a guide section, and a lever portion extended from one side of the sleeve portion to locate in a gap provided on the annular stopper; and a sucker unit including a suction cup located in the cavity, a link connected to a back of the suction cup to upward extend through the limiting seat, an elastic element mounted between the suction cup and the sucker holder, and a lid mounted in the sleeve portion to couple with the link and externally provided with a guide slide corresponding to the guide section in the sleeve portion.

BRIEF DESCRIPTION OF THE DRAWINGS

The structure and the technical means adapted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
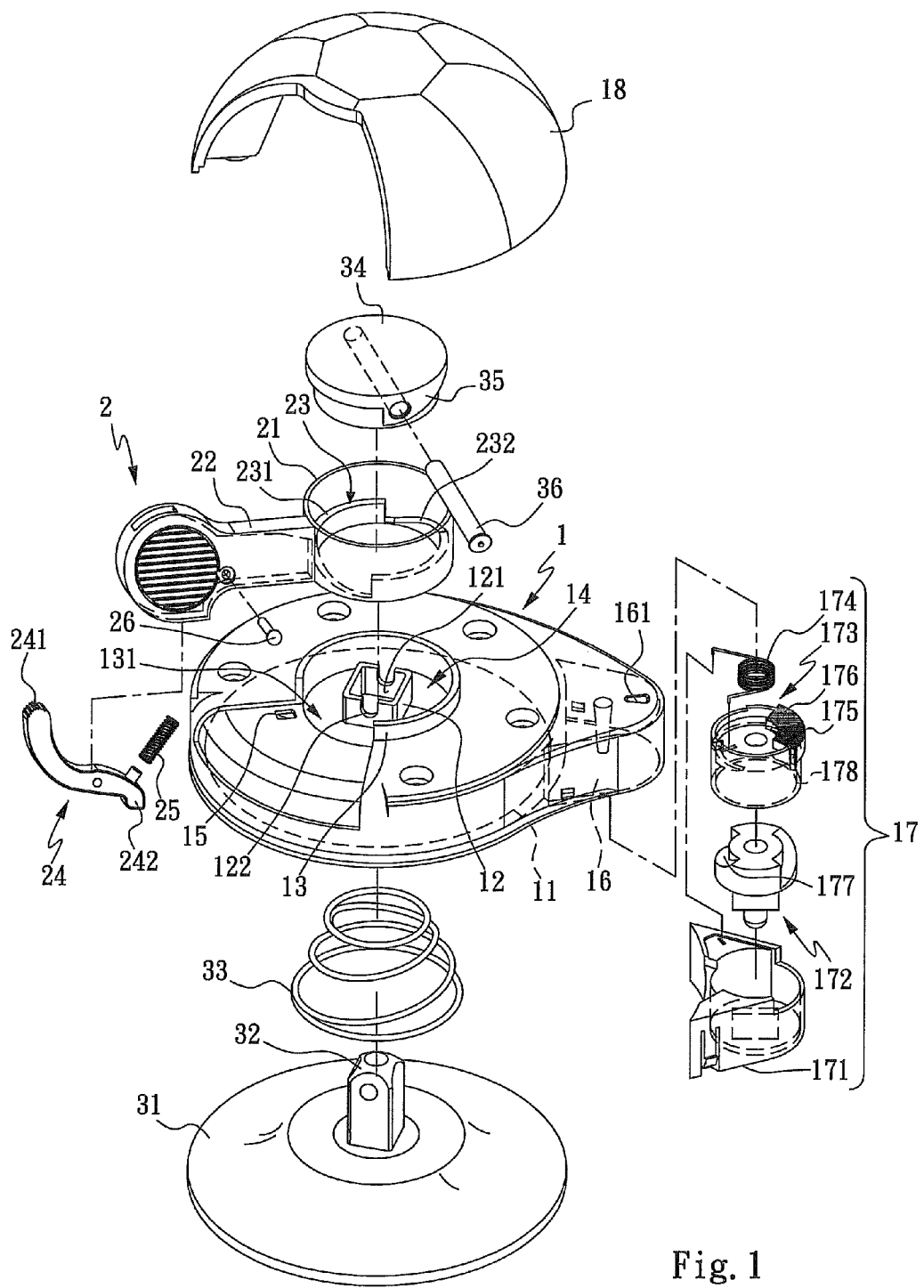
FIG. 1 is an exploded perspective view of a suction device according to the present invention.
Figure 2:
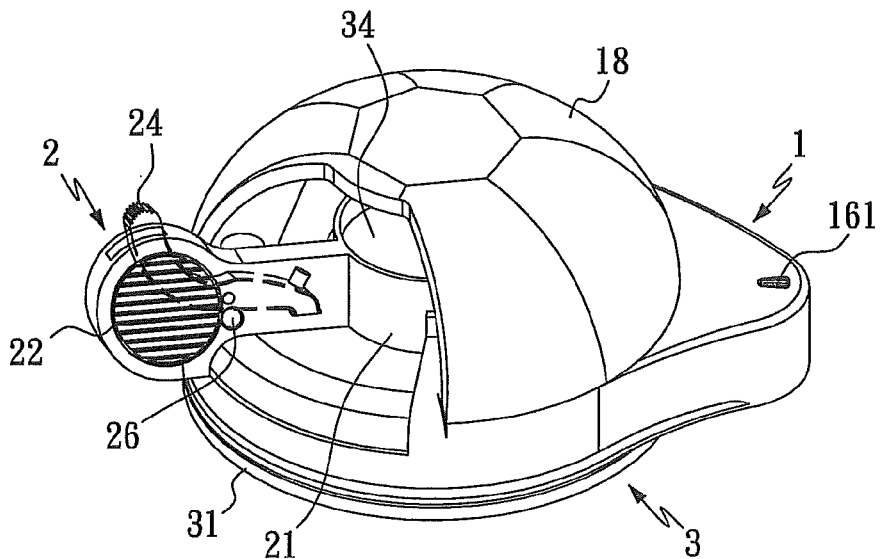
FIG. 2 is an assembled view of FIG. 1.

Please refer to FIGS. 1 and 2 that are exploded and assembled perspective views, respectively, of a suction device according to a preferred embodiment of the present invention. As shown, the suction device of the present invention includes a sucker holder 1, a control lever 2, and a sucker unit 3. Through proper operation of the control lever 2, the sucker unit 3 coupled with the sucker holder 1 is able to firmly suction adhere to a desired position.

The sucker holder 1 has a lower side defining a cavity 11, and an upper side on which a limiting seat 12 is provided. The limiting seat 12 internally defines a through opening 121 communicating with the cavity 11, and is provided on two opposite walls thereof with two corresponding notches 122. An annular stopper 13 is provided on the upper side of the sucker holder 1 near and around the limiting seat 12, so that a fitting zone 14 is formed between the limiting seat 12 and the annular stopper 13. The annular stopper 13 is provided at one side with a gap 131 of a predetermined size; and a retaining hole 15 is provided on the sucker holder 1 near and outside the gap 131 of the annular stopper 13. The sucker holder 1 is so configured that a compartment 16 having a window 161 is formed at a lateral side of the sucker holder 1 for receiving a suction power detection unit 17 therein.

The suction power detection unit 17 includes a receiving seat 171, a probe 172 and an indicating member 173 mounted in the receiving seat 171, and an elastic element 174 connecting the receiving seat 171 to the indicating member 173. The indicating member 173 has a green indication zone 175 and a red indication zone 176 located corresponding to the window 161. The probe 172 is provided with an inward curved face 177, and the indicating member 173 is provided with a push block 178 corresponding to the inward curved face 177. An upper cover 18 may be provided to shield the upper side of the sucker holder 1.

The control lever 2 includes a sleeve portion 21 movably fitted in the fitting zone 14 on the sucker holder 1, and a lever portion 22 extended from one side of the sleeve portion 21 to locate within the gap 131 of the annular stopper 13. The sleeve portion 21 is provided on an inner wall surface with a guide section 23, which consists of two corresponding and spaced horizontal planes 231, each of which has a slope 232 extended from an end thereof. A limiting arm 24 is pivotally mounted inside the lever portion 22 via a pivot shaft 26 with an end of the limiting arm 24 projected from a top of the lever portion 22 to serve as a push head 241. Another end of the limiting arm 24 opposite to the push head 241 is an engaging head 242 projected from a bottom of the lever portion 22 to interfere with the retaining hole 15 on the sucker holder 1. An elastic element 25 is mounted between the lever portion 22 and the limiting arm 24.

The sucker unit 3 includes a suction cup 31 located in the cavity 11 at the lower side of the sucker holder 1, a link 32 connected to a back of the suction cup 31 to upward extend through the opening 121 defined in the limiting seat 12, an elastic element 33 mounted between the suction cup 31 and the cavity 11 of the sucker holder 1, and a lid 34 mounted in the sleeve portion 21 and coupled with the link 32. The lid 34 is externally provided on a sidewall with a guide slide 35 corresponding to the guide section 23 in the sleeve portion 21, and is coupled with the link 32 via a pin 36, which is located in the two opposite notches 121 to extend across the limiting seat 12.

Figure 3:
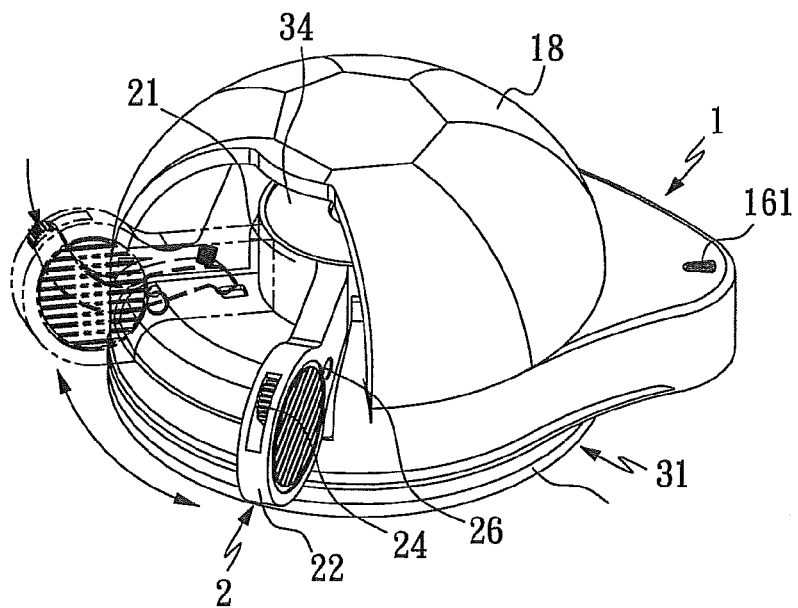
FIG. 3 shows the manner of using the suction device of the present invention.
Figure 4:
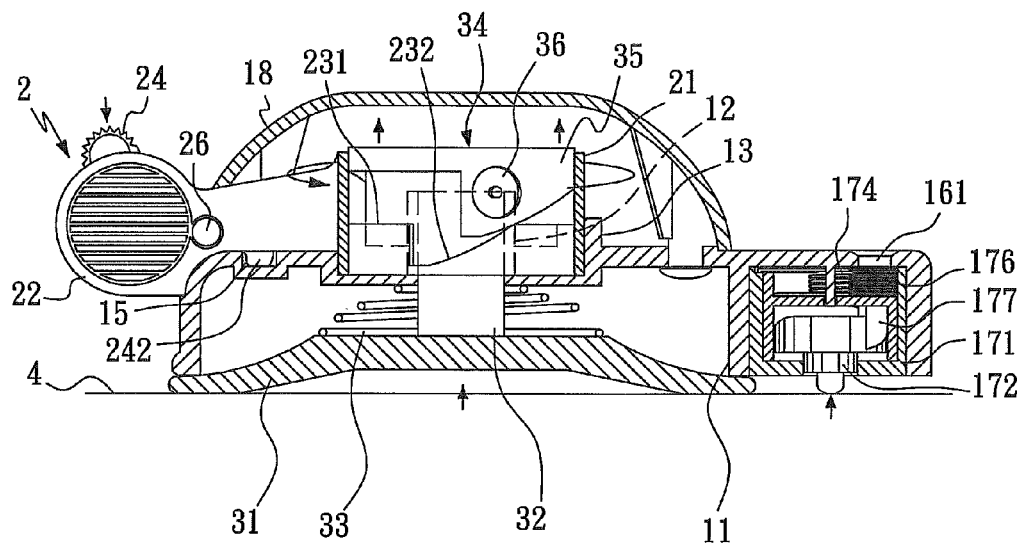
FIG. 4 is a vertical sectional view showing the suction device of the present invention in a suction-enhanced state.
Figure 5:
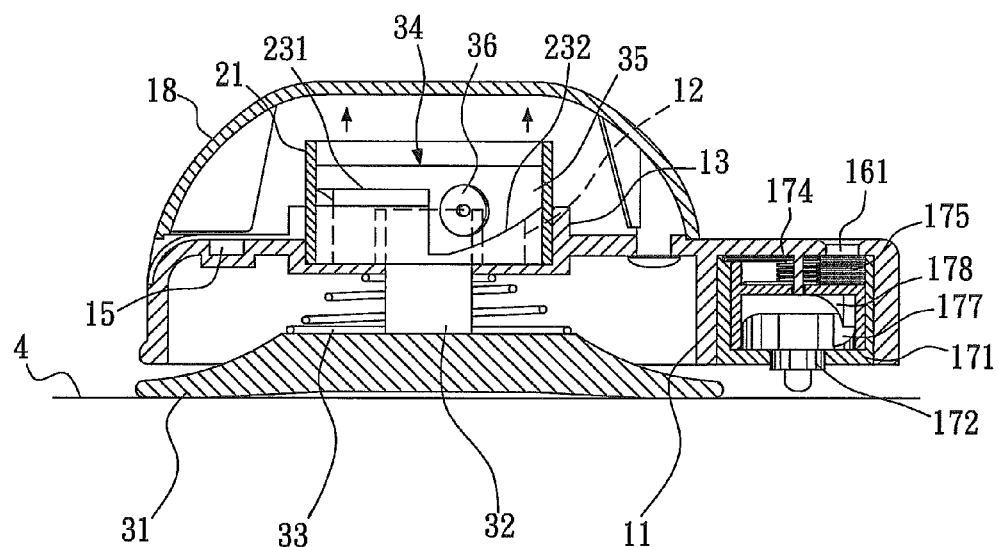
FIG. 5 is another vertical sectional view showing the suction device of the present invention in a suction-released state.

Please refer to FIG. 3 that shows the manner of using the suction device of the present invention; and to FIGS. 4 and 5 that are vertical sectional views showing the suction device of the present invention in a suction-enhanced and a suction-released state, respectively. As shown, to use the suction device of the present invention, first contact the suction cup 31 of the sucker unit 3 with a desired wall surface 4 for mounting the suction device. Then, push the control lever 2 at the lever portion 22 so as to turn the sleeve portion 21 at one end of the lever portion 22, bringing the guide slide 35 on the sidewall of the lid 34 mounted in the sleeve portion 21 to slide from the slopes 232 of the guide section 23 onto the horizontal planes 231. This will cause the lid 34 to move upward in the sleeve portion 21 and thereby upward pull the link 32 at the back of the suction cup 31. At this point, the suction cup 31 becomes closer to the wall surface 4, and air between the suction cup 31 and the wall surface 4 is forced out of the suction cup 21. Meanwhile, the engaging head 242 of the limiting arm 24 projected from the bottom of the lever portion 22 of the lever unit 2 is pushed by the elastic element 25 to interfere with the retaining hole 15 on the sucker holder 1, restricting the control lever 2 from moving. As a result, the sucker unit 3 is tightly adhered to the wall surface 4 via the suction cup 31. When the sucker unit 3 is suction-adhered to the wall surface 4, the probe 172 of the suction power detection unit 17 is brought to press against the wall surface 4 and thereby pushed toward the indicating member 173. At this point, the inward curved face 177 extended along two sides of the probe 172 pushes against the push block 178 on the inner wall surface of the indicating member 173 to thereby turn the indicating member 173 and compress the elastic element 174, so that the green indication zone 175 is aligned with the window 161 on the compartment 16, indicating that the sucker unit 3 has been tightly suction adhered to the wall surface 4.

When it is desired to remove the suction device from the wall surface 4, first apply a downward force on the push head 241 of the limiting arm 24, so that the elastic element 25 is compressed, and the engaging head 242 of the limiting arm 24 is allowed to disengage from the retaining hole 15 on the sucker holder 1. Then, push the control lever 2 in a reverse direction to turn the sleeve portion 21 thereof. At this point, the guide slide 35 on the sidewall of the lid 34 is moved from the horizontal planes 231 of the guide section 23 onto the slopes 232, bringing the lid 34 in the sleeve portion 21 to move downward and thereby push the link 32 downward, so that the suction cup 31 is released from the wall surface 4. Meanwhile, the probe 172 of the suction power indication unit 17 is no longer pressed against the wall surface 4 and the elastic element 174 is released, bringing the push block 178 of the indicating member 173 to move along the inward curved face 177 on the probe 172 for the red indication zone 176 to align with the window 161 on the compartment 16, indicating that the sucker unit 3 is no longer tightly suction-adhered to the wall surface 4.

When the suction device of the present invention has been used over a period of time, or the suction device is not firmly mounted, or the suction cup 31 could not be drawn closer to the wall surface 4 via the control lever 2 and becomes loosened from the wall surface 4, the probe 171 of the suction power indication unit 17 would also become separated from the wall surface 4 to thereby release the elastic element 174, bringing the push block 178 of the indicating member 173 to move along the inward curved face 177 on the probe 172 for the red indication zone 176 to align with the window 161 on the compartment 16, indicating that the sucker unit 3 is no longer tightly suction adhered to the wall surface 4. With these arrangements, a user may have an idea about the suction adherence between the sucker unit 3 and the wall surface 4.

What is claimed is:

1. A suction device, comprising:
   a sucker holder defining a cavity at a lower side thereof, and being provided at an upper side thereof with a limiting seat internally defining an opening communicating with the cavity, and an annular stopper extended near and around the limiting seat to form a fitting zone between the limiting seat and the annular stopper; and the annular stopper having a gap formed at one side thereof;
   a control lever including a sleeve portion movably fitted in the fitting zone on the sucker holder, and a lever portion extended from one side of the sleeve portion and located within the gap of the annular stopper; and the sleeve portion being provided on an inner wall surface with a guide section; and
   a sucker unit including a suction cup located in the cavity at the lower side of the sucker holder, a link connected to a back of the suction cup to upward extend through the opening defined in the limiting seat, an elastic element mounted between the suction cup and the cavity of the sucker holder, and a lid mounted in the sleeve portion and coupled with the link; and the lid being externally provided on a sidewall with a guide slide corresponding to the guide section in the sleeve portion.

2. The suction device as claimed in claim 1, further comprising an upper cover closed onto the upper side of the sucker holder.

3. The suction device as claimed in claim 1, wherein the limiting seat on the sucker holder is provided on two opposite walls thereof with two corresponding notches.

4. The suction device as claimed in claim 1, wherein the sucker holder is provided near the gap of the annular stopper with a retaining hole.

5. The suction device as claimed in claim 1, wherein the sucker holder is provided at a lateral side with a compartment having a window formed thereon and a suction power detection unit received therein; the suction power detection unit including a receiving seat, a probe and an indicating member mounted in the receiving seat, and an elastic element connecting the receiving seat to the indicating member; and the indicating member having two indication zones located corresponding to the window on the compartment.

6. The suction device as claimed in claim 5, wherein the probe is provided with an inward curved face, and the indicating member is provided with a push block corresponding to the inward curved face.

7. The suction device as claimed in claim 1, wherein the guide section in the sleeve portion consists of two corresponding and spaced horizontal planes, each of which has a slope extended from an end thereof.

8. The suction device as claimed in claim 1, wherein the lever portion of the control lever includes a limiting arm pivotally mounted therein, such that an end of the limiting arm is projected from a top of the lever portion to serve as a push head, and another end of the limiting arm opposite to the push head is an engaging head projected from a bottom of the lever portion to interfere with the sucker holder; and an elastic element mounted between the lever portion and the limiting arm.

9. The suction device as claimed in claim 8, wherein the limiting arm is pivotally mounted inside the lever portion via a pivot shaft.

10. The suction device as claimed in claim 1, wherein the lid is coupled with the link on the back of the suction cup via a pin.

* * * * *